United States Patent
Chowdhury et al.

(10) Patent No.: US 10,234,263 B2
(45) Date of Patent: Mar. 19, 2019

(54) NON-CONTACT ANGLE/TORQUE SENSOR FOR STEERING APPARATUS OF VEHICLE

(71) Applicant: MANDO CORPORATION, Gyeonggi-do (KR)

(72) Inventors: Mazharul Chowdhury, Midland, MI (US); Stephen Waligorski, Midland, MI (US); Neil Moniz, Bay City, MI (US); Victor Dahn, Pinconning, MI (US); Troy Strieter, Sebewaing, MI (US); Scott Blehm, Saginaw, MI (US); Joshua Grove, Sanford, MI (US); Mohammad Islam, Bay City, MI (US); Christian Ross, Bay City, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 62 days.

(21) Appl. No.: 15/381,060

(22) Filed: Dec. 15, 2016

(65) Prior Publication Data

US 2018/0170432 A1    Jun. 21, 2018

(51) Int. Cl.
*G01L 3/04* (2006.01)
*G01B 7/30* (2006.01)
*G01L 5/22* (2006.01)
*G01D 5/245* (2006.01)

(52) U.S. Cl.
CPC ............. *G01B 7/30* (2013.01); *G01D 5/2451* (2013.01); *G01L 5/221* (2013.01)

(58) Field of Classification Search
CPC .......... G01B 7/30; G01L 5/221; G01L 3/101; G01L 3/102; G01L 3/106; G01L 3/108; G01L 3/00; G01L 3/02; G01L 3/10; G01L 3/1457; B62D 5/04; B62D 5/0481; B62D 15/0215
USPC ....... 73/862.191, 862.193, 862.331–862.338
See application file for complete search history.

(56) References Cited

U.S. PATENT DOCUMENTS

| | | | |
|---|---|---|---|
| 7,028,545 B2* | 4/2006 | Gandel | G01L 3/104 73/328 |
| 7,644,635 B2* | 1/2010 | Prudham | G01L 3/104 73/862.331 |
| 8,776,619 B2* | 7/2014 | Jammer | G01L 3/104 73/862.333 |
| 8,890,514 B2* | 11/2014 | Masson | B62D 6/10 324/207.21 |
| 8,984,964 B2* | 3/2015 | Lee | G01L 3/101 73/862.193 |

(Continued)

*Primary Examiner* — Jonathan Dunlap
*Assistant Examiner* — Octavia Hollington
(74) *Attorney, Agent, or Firm* — Ladas & Parry LLP

(57) ABSTRACT

A non-contact angle/torque sensor comprises an upper rotor in an annular shape having a central axis, and in which magnets are located, the magnets positioned within the annular shape around the central axis with the north and the south poles of adjacent magnets being oriented opposite to one another, and a lower rotor in an annular shape and sharing the central axis of the upper rotor, and located spaced outwardly from an outer circumferential surface of the upper rotor. The lower rotor has upper and lower stators spaced apart along the central axis. The upper stator has upper and lower backplanes and a series of upper and lower extensions extending from the respective backplanes. The upper extensions and the lower extensions are not intermeshed or overlapped.

27 Claims, 11 Drawing Sheets

(56) References Cited

U.S. PATENT DOCUMENTS

| | | | | |
|---|---|---|---|---|
| 9,347,843 | B2* | 5/2016 | Franz | G01L 3/102 |
| 9,366,590 | B2* | 6/2016 | Song | B62D 6/10 |
| 2015/0022044 | A1* | 1/2015 | Chowdhury | H02K 1/148 |
| | | | | 310/156.53 |
| 2016/0049837 | A1* | 2/2016 | Helbling | H02K 1/30 |
| | | | | 310/156.22 |

* cited by examiner

NON-CONTACT ANGLE/TORQUE SENSOR FOR STEERING APPARATUS OF VEHICLE

TECHNICAL FIELD

The present disclosure relates to an angle or torque sensor, and more particularly, to a non-contact angle or torque sensor which can be applied to a steering apparatus for a vehicle.

BACKGROUND

In some embodiments, a steering apparatus used in a vehicle can be an apparatus which changes a direction of vehicle wheels through a steering wheel and thus changes a moving direction of the running vehicle.

The steering apparatus can have an electric power steering (EPS) system in consideration of moving safety and convenience, and the EPS system can include a torque measuring device or the like.

In general, a torque sensor can be installed at the torque measuring device to measure a torque applied to a steering shaft. The torque sensor can include a housing, a rotor which can be rotated with a steering shaft, and a ring-shaped gear having gear teeth.

Particularly, in some embodiments of torque sensors, separate retention features in which various fasteners such as screws, rivets, bolts, nuts, adhesives, and solders can be provided and installed between the rotor and the gear to fix the rotor and the gear.

However, in some such torque sensors, the number of components, such as the fasteners and the retention features can be significant and the production cost of the sensor is increased. Also, in some embodiments, the operation of installing fasteners and retention features between the rotor and the gear can be very inconvenient and difficult, requiring the use of additional labor and assembly time, and thus resulting in reduced productivity. In addition, due to frequent rotation of the rotor, the fasteners and the retention features can be easily damaged with the further result that the durability of the sensor can be considerably reduced.

Further, some designs of torque sensors, have a configuration where replacement of one of a rotor, stator or sensor package can require the removal of all of these parts, and then replacement of all of these parts as a unit. Such required replacement of all of these parts can lead to additional repair expense and additional labor requirements for such repair.

SUMMARY OF THE INVENTION

The present disclosure describes to an angle/torque sensor which has improved features as described herein. In some embodiments, the angle/torque sensor can be configured to allow at least one of the probe housing, upper rotor and lower rotor to be removed or serviced without removing one or more of the others. In some embodiments, at least one of the probe housing, upper rotor and lower rotor can be configured to not intermesh or overlap with the others.

The present disclosure also describes an angle/torque sensor which in some embodiments, magneto-sensitive elements such hall or magnetoresistive (MR) sensor(s) can be located between or adjacent to flux collectors configured to be separable from a rotor and/or a stator such that when only the flux collector and/or other magneto-sensitive elements break down, the flux collector and the other magneto-sensitive elements can be easily separated, repaired and replaced without needing to replace the other parts, such as a rotor or stator, and thus customer support costs can be reduced.

However, technical benefits which are described in the present disclosure are not limited to the above-described benefits, but other benefits will be clearly understood by those skilled in the art from the following description.

In a first aspect, a non-contact angle/torque sensor is provided, the non-contact angle/torque sensor comprising an upper rotor of the non-contact angle/torque sensor which is formed in an annular shape having a central axis, and in which magnets are located, the magnets being positioned within the annular shape around the central axis with the north and the south poles of adjacent magnets being oriented opposite to one another; and a lower rotor formed in an annular shape and sharing the central axis of the upper rotor, the lower rotor located spaced outwardly from an outer circumferential surface of the upper rotor, the lower rotor comprising an upper stator; and a lower stator arranged in a spaced apart relationship along the central axis, the upper stator having an upper backplane; and a series of upper extensions extending from the upper backplane; the lower stator having: a lower backplane; and a series of lower extensions extending from the lower backplane, wherein the upper extensions and the lower extensions are not intermeshed or overlapped.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket, and each of the first and second gaps extend only part of the way to the inner wall.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket, and each of the first and second gaps extend at least half way to the inner wall.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket, and each of the plurality of magnet pockets is formed from in soft magnetic material.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket, and each of the plurality of magnet pockets is formed within a soft magnetic material, and the soft magnetic material is powdered metal or laminated metal and optionally laminated steel.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket, and the outer circumferential surface of the upper rotor comprises a series of curved zones curving outward from the central axis and where each of the curved zones corresponds to one of the magnet pockets, wherein at least a portion of each of the curved zones has a section having a curvature that varies continuously over the section.

In an embodiment of the first aspect, the upper rotor comprises a plurality of magnet pockets, each magnetic pocket having an outer surface, an inner surface, a first side surface and a second side surface, the inner and outer surfaces located facing one another with the outer surface being more distal the central axis than the inner surface, the first and second side walls extending between the inner and outer walls; wherein each of the magnet pockets is associated with one of the magnets, and for each of the magnetic pockets, the inner wall and the outer wall contact the magnet associated with the pocket while there is a first gap between at least a portion of the first side wall adjacent the outer wall and the magnet associated with the pocket, and a second gap between at least a portion of the second side wall adjacent the outer wall and the magnet associated with the pocket, and the outer circumferential surface of the upper rotor comprises a series of curved zones curving outward from the central axis and where each of the curved zones corresponds to one of the magnet pockets, wherein at least a portion of each of the curved zones has a curvature that is different from a curvature of an overall curvature circle of the upper rotor, and a gap is present between the upper and lower extensions and the curved surface, wherein the gap at any point along the curved surface is described by the equation:

$$g(\theta) = \frac{g_{min}}{\cos\left(\frac{P}{2}\theta\right)}, \text{ for } -\frac{180°}{P} < \theta < +\frac{180°}{P} \qquad \text{[Equation 1]}$$

wherein:
$g(\theta)$ is the gap between the upper and lower rotor at angular position $\theta$,
$g_{min}$ is the minimum magnetic gap between upper and lower rotors,
$g_{max}$ is the maximum gap between the upper and lower rotors located at an end of the curved zone,
P is the number of magnets, and
$\theta$ is the angular position around the circumference of the upper rotor with $\theta$ at the midpoint of the curved zone and the apex being at the central axis of the upper rotor.

In an embodiment of the first aspect, the upper and lower extensions protrude toward the outer circumferential surface of the upper rotor and the upper and lower extensions extend from inner circumferential surfaces of the upper stator and the lower stator, respectively.

In an embodiment of the first aspect, the upper and lower extensions protrude toward the outer circumferential surface of the upper rotor and the upper and lower extensions extend from inner circumferential surfaces of the upper stator and the lower stator, respectively, and the upper extensions protrude from an upper portion of the inner circumferential surface of the upper stator toward the outer circumferential surface of the upper rotor, and the lower extensions protrude from a lower portion of the inner circumferential surface of the lower stator toward the outer circumferential surface of the upper rotor.

In an embodiment of the first aspect, the upper and lower extensions protrude toward the outer circumferential surface of the upper rotor and the upper and lower extensions extend from inner circumferential surfaces of the upper stator and the lower stator, respectively, and the upper extensions protrude from an upper portion of the inner circumferential surface of the upper stator toward the outer circumferential surface of the upper rotor, and the lower extensions protrude from a lower portion of the inner circumferential surface of the lower stator toward the outer circumferential surface of the upper rotor, and each of the upper extensions comprises a first countering portion, and the first countering portion is formed upward or downward at an end of each of the upper extensions to face the outer circumferential surface of the upper rotor, and each of the lower extensions comprises a second countering portion, and the second countering portion is formed upward or downward at an end of each of the lower extensions to face the outer circumferential surface of the upper rotor.

In an embodiment of the first aspect, the upper and lower extensions protrude toward the outer circumferential surface of the upper rotor and the upper and lower extensions extend from inner circumferential surfaces of the upper stator and the lower stator, respectively, and the upper extensions protrude from a lower portion of the inner circumferential surface of the upper stator toward the outer circumferential surface of the upper rotor, and the lower extensions protrude from an upper portion of the inner circumferential surface of the lower stator toward the outer circumferential surface of the upper rotor.

In an embodiment of the first aspect, the upper and lower extensions protrude toward the outer circumferential surface of the upper rotor and the upper and lower extensions extend from inner circumferential surfaces of the upper stator and the lower stator, respectively, and the upper extensions protrude from a lower portion of the inner circumferential surface of the upper stator toward the outer circumferential surface of the upper rotor, and the lower extensions protrude from an upper portion of the inner circumferential surface of the lower stator toward the outer circumferential surface of the upper rotor and, each of the upper extensions comprises a first countering portion formed upward or downward at an end of each of the upper extensions to face the outer circumferential surface of the upper rotor, and each of the lower extensions comprises a second countering portion formed upward or downward at an end of each of the lower extensions to face the outer circumferential surface of the upper rotor.

In an embodiment of the first aspect, the upper and lower extensions protrude toward the outer circumferential surface of the upper rotor and the upper and lower extensions extend from inner circumferential surfaces of the upper stator and the lower stator, respectively, and the upper extensions protrude from a middle area of the inner circumferential surface of the upper stator toward the outer circumferential surface of the upper rotor, and the lower extensions protrude from a middle area of the inner circumferential surface of the lower stator toward the outer circumferential surface of the upper rotor.

In an embodiment of the first aspect, the upper and lower extensions protrude toward the outer circumferential surface of the upper rotor and the upper and lower extensions extend from inner circumferential surfaces of the upper stator and the lower stator, respectively, and the upper extensions protrude from a middle area of the inner circumferential surface of the upper stator toward the outer circumferential surface of the upper rotor, and the lower extensions protrude from a middle area of the inner circumferential surface of the lower stator toward the outer circumferential surface of the upper rotor, and each of the upper extensions comprises a first countering portion formed upward and downward at an end of each upper extension to face the outer circumferential surface of the upper rotor, and each of the lower extensions comprises a second countering portion formed upward and downward at an end of each of the lower extensions to face the outer circumferential surface of the upper rotor.

In an embodiment of the first aspect, each of the upper extensions faces the outer circumferential surface of the upper rotor and is formed upward at an inner circumferential surface of the upper stator, and each of the lower extensions faces the outer circumferential surface of the upper rotor and is formed downward at an inner circumferential surface of the lower stator.

In an embodiment of the first aspect, and each of the upper extensions faces the outer circumferential surface of the upper rotor and is formed downward at an inner circumferential surface of the upper stator, and each of the lower extensions face a the outer circumferential surface of the upper rotor and is formed upward at an inner circumferential surface of the lower stator.

In an embodiment of the first aspect, and each of the upper extensions faces the outer circumferential surface of the upper rotor and is formed upward and downward at an inner circumferential surface of the upper stator, and each of the lower extensions faces the outer circumferential surface of the upper rotor and is formed upward and downward at an inner circumferential surface of the lower stator.

In an embodiment of the first aspect further comprising a flux collector located spaced apart from the lower rotor and in magnetic communication with at least a portion of the magnets, and the flux collector does not extend over or under the lower rotor.

In an embodiment of the first aspect further comprising a flux collector located spaced apart from the lower rotor and in magnetic communication with at least a portion of the magnets, and the flux collector does not extend over or under the lower rotor, and a collector gap is present between the flux collector, and an outer circumferential surface of lower rotor and the collector gap is optionally in a radial direction from the outer circumferential surface of the lower rotor.

In an embodiment of the first aspect further comprising a flux collector located spaced apart and/or radially displaced outward from the lower rotor and in magnetic communication with at least a portion of the magnets, wherein the flux collector does not extend over or under the lower rotor, and a collector gap is present between the flux collector, and an outer circumferential surface of lower rotor, and a width of at least a portion of the collector gap has a varying gap width which optionally varies sinusoidally.

In an embodiment of the first aspect further comprising a flux collector located spaced apart from the lower rotor and in magnetic communication with at least a portion of the magnets, and the flux collector does not extend over or under the lower rotor, and the flux collector comprises a first flux collector located spaced apart from an outer circumferential surface of the upper stator and in magnetic communication with one or more of the magnets, and a second flux collector located spaced apart from an outer circumferential surface of the lower stator and in magnetic communication with at least one of the magnets.

In an embodiment of the first aspect further comprising a flux collector located spaced apart from the lower rotor and in magnetic communication with at least a portion of the magnets, and the flux collector does not extend over or under the lower rotor, and the flux collector comprises a first flux collector located spaced apart from an outer circumferential surface of the upper stator and in magnetic communication with one or more of the magnets, and a second flux collector located spaced apart from an outer circumferential surface of the lower stator and in magnetic communication with at least one of the magnets, and the second flux collector is disposed at a position corresponding to the first flux collector.

In an embodiment of the first aspect further comprising a flux collector located spaced apart from the lower rotor and in magnetic communication with at least a portion of the magnets, and the flux collector does not extend over or under the lower rotor, and the flux collector comprises a first flux collector located spaced apart from an outer circumferential surface of the upper stator and in magnetic communication with one or more of the magnets, and a second flux collector located spaced apart from an outer circumferential surface of the lower stator and in magnetic communication with at least one of the magnets, and a magneto-sensitive element is disposed between the first flux collector and the second flux collector.

In an embodiment of the first aspect further comprising a flux collector located spaced apart from the lower rotor and in magnetic communication with at least a portion of the magnets, and the flux collector does not extend over or under the lower rotor, and the flux collector comprises a first flux collector located spaced apart from an outer circumferential surface of the upper stator and in magnetic communication with one or more of the magnets, and a second flux collector located spaced apart from an outer circumferential surface of the lower stator and in magnetic communication with at least one of the magnets, and the first flux collector comprises at least one collector extension which is formed to protrude toward the outer circumferential surface of the upper stator, and the second flux collector comprises at least one collector extension which is formed to protrude toward the outer circumferential surface of the lower stator.

In an embodiment of the first aspect further comprising a flux collector located spaced apart from the lower rotor and in magnetic communication with at least a portion of the magnets, and the flux collector does not extend over or under the lower rotor, and the flux collector comprises a first flux collector located spaced apart from an outer circumferential surface of the upper stator and in magnetic communication with one or more of the magnets, and a second flux collector located spaced apart from an outer circumferential surface of the lower stator and in magnetic communication with at least one of the magnets, and the second flux collector is disposed at a position corresponding to the first flux collector, and further comprising a probe housing comprising the flux collector, wherein each of the probe housing, the upper rotor and the lower rotor are configured to be installable and removable independently of one another.

In an embodiment of the first aspect, the upper stator is configured such that there is no protrusion from the backplane extending toward or away from the central axis other than the upper extensions.

In an embodiment of the first aspect, the lower stator is configured such that there is no protrusion from the backplane extending toward or away from the central axis other than the lower extensions.

In an embodiment of the first aspect, at least one of the magnets is an induced magnet.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
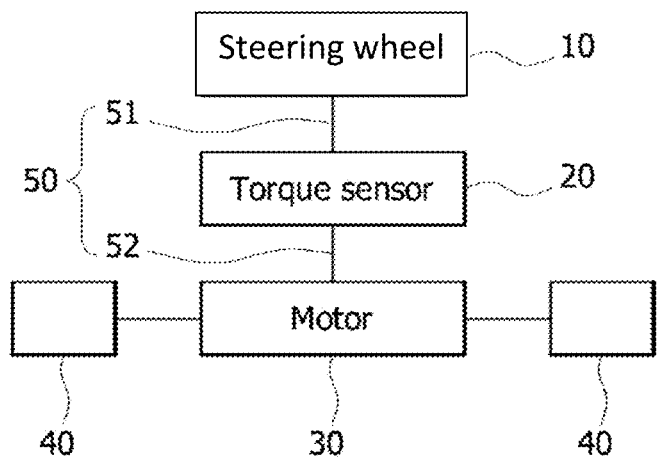
FIG. 1 is a block diagram of an embodiment of an electric power steering system to which a non-contact angle/torque sensor according to one embodiment of the present invention is applied.

Exemplary embodiments of the present invention will be described in detail below with reference to the accompanying drawings, wherein like reference numerals refer to like or corresponding elements throughout the drawings and repeated description thereof will be omitted.

Further, in the following description, if it is considered that the specific description of the related and noticed functions or structures may obscure the gist of the present disclosure, the specific description will be omitted. Also, the accompanying drawings are used to help easily understand the technical idea of the present invention and it should be understood that the idea of the present disclosure is not limited by the accompanying drawings.

First, before a first embodiment of a non-contact angle/torque sensor is described, an electric power steering system to which a non-contact angle/torque sensor, such as described herein, can be applied will be briefly described. FIG. 1 is a block diagram of an embodiment of an electric power steering system to which a non-contact angle/torque sensor, such as described herein, can be applied.

As illustrated in FIG. 1, an embodiment of an electric power steering system to which the non-contact angle/torque sensor is applied includes a steering wheel 10, a torque sensor 20, a power assist source 30, and a steering shaft 50.

In this embodiment, the torque sensor 20 detects a changing amount of an angle and/or a torque based on rotation of the steering wheel 10. An electronic control unit (ECU) generates a control signal based on a signal transmitted from the torque sensor 20, and the power means 30 serves to drive a motor based on the control signal transmitted from the ECU, thereby steering a wheel 40 of a vehicle. The steering shaft 50 serves to physically connect the elements, and includes an upper half 51 of the shaft which connects the steering wheel 10 with the torque sensor 20, and a lower half 52 of the shaft which connects the torque sensor 20 and the power means 30.

Figure 2:
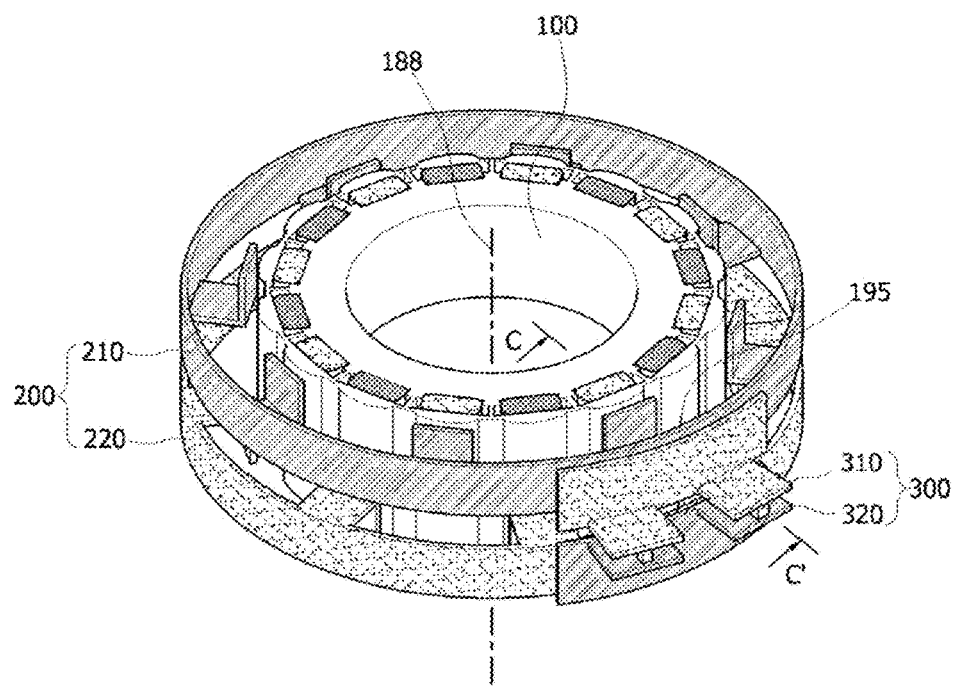
FIG. 2 is a perspective view of the non-contact angle/torque sensor according to one embodiment of the present disclosure.
Figure 3:
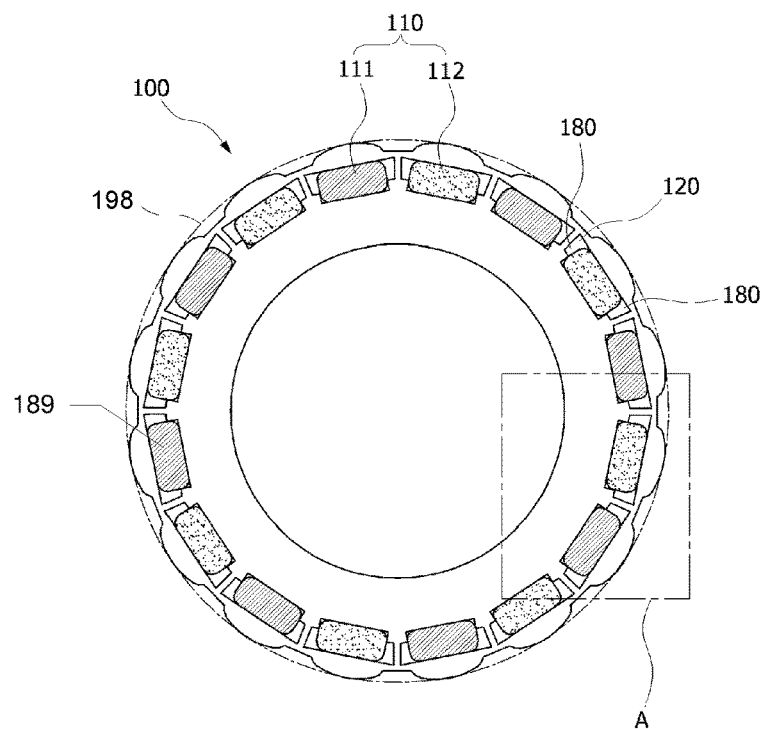
FIG. 3 is a plan view illustrating an upper rotor of the non-contact angle/torque sensor according to one embodiment of the present disclosure.
Figure 4:
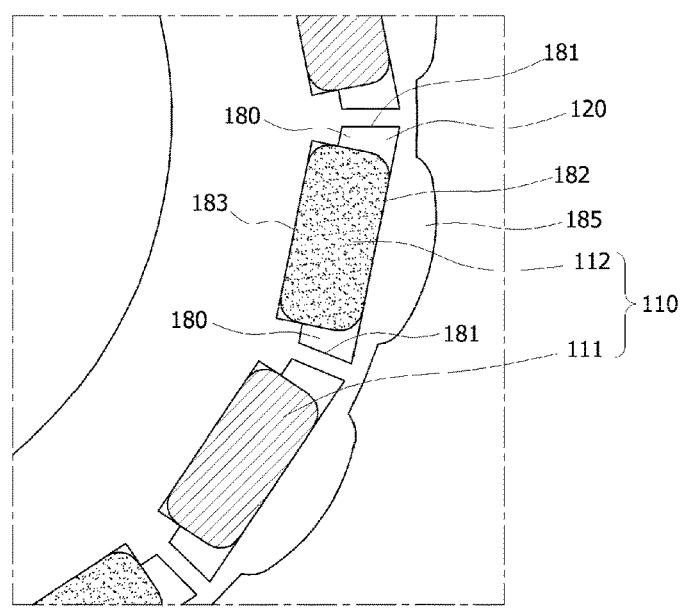
FIG. 4 is an enlarged view of a portion A of FIG. 3.
Figure 5:
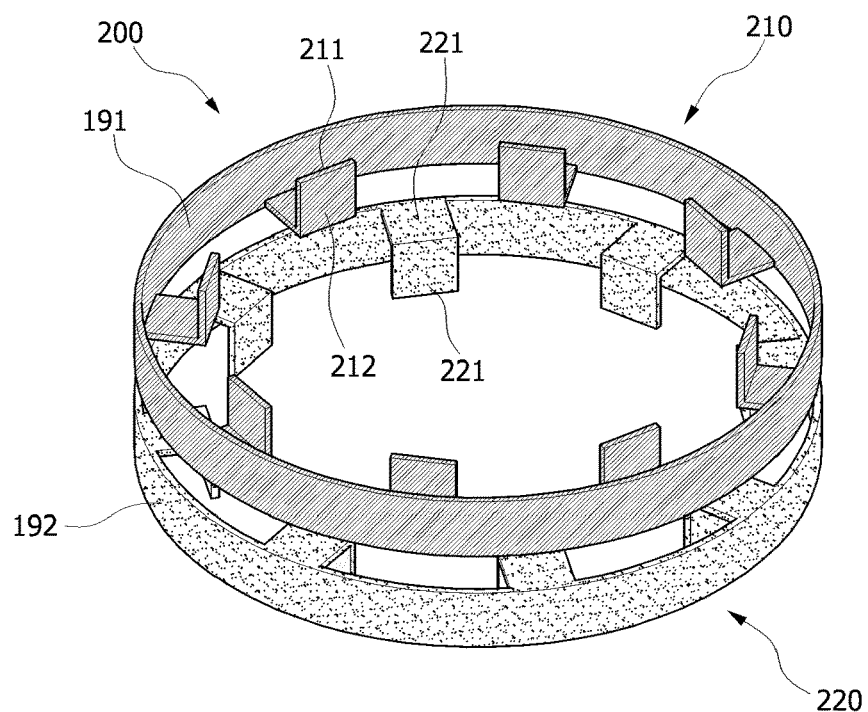
FIG. 5 is a view illustrating a lower rotor of the non-contact angle/torque sensor according to one embodiment of the present disclosure.
Figure 6:
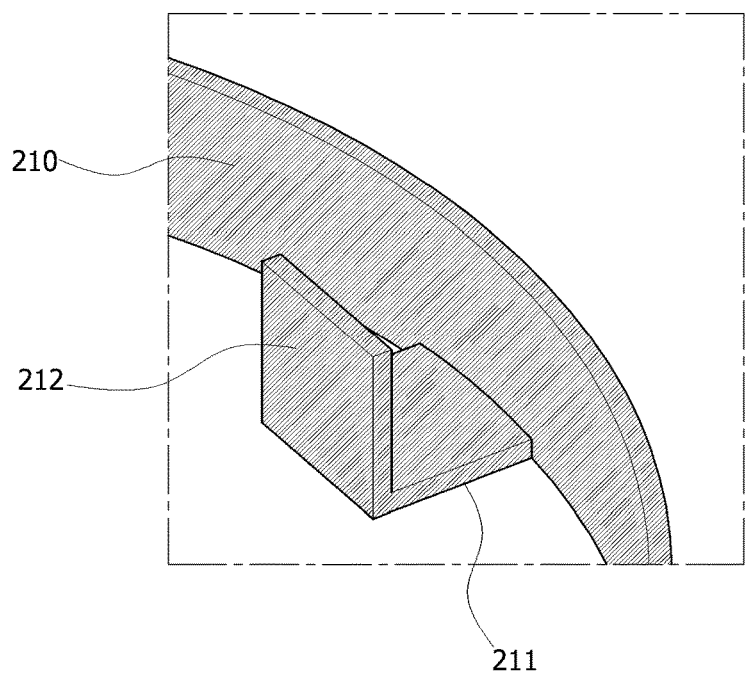
FIG. 6 shows an extension present in FIG. 5.
Figure 7:
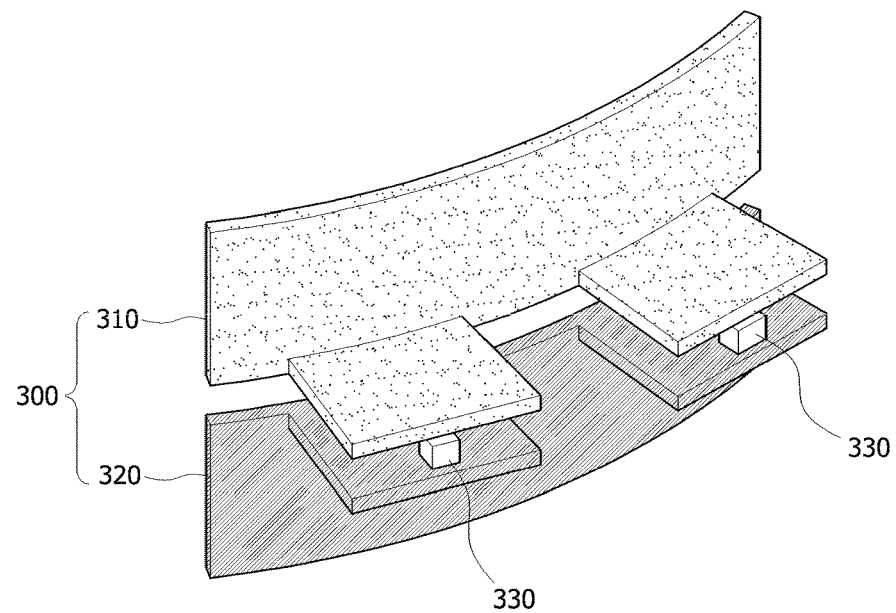
FIG. 7 is a view illustrating a flux collector of the non-contact angle/torque sensor according to one embodiment of the present disclosure.
Figure 8:
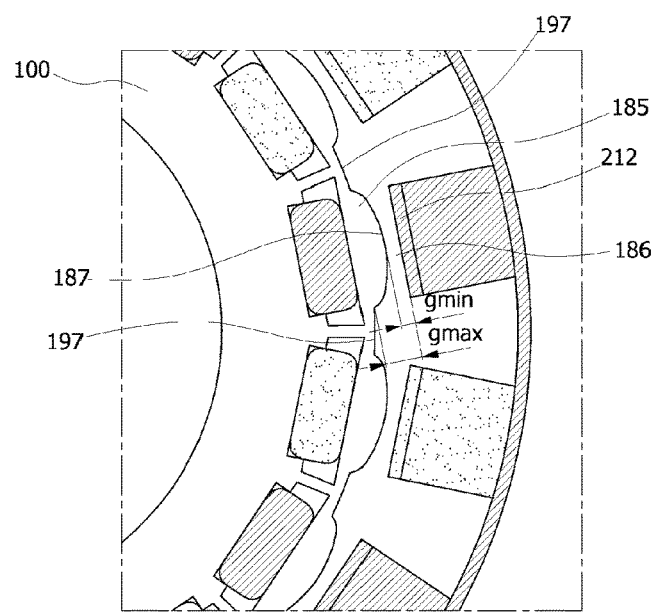
FIG. 8 is a plan view partly illustrating a state in which the upper rotor and the lower rotor of the non-contact angle/torque sensor according to one embodiment of the present disclosure are coupled with each other.

Hereinafter, embodiments of the non-contact angle/torque sensor will be described based as applied to an electric power steering system, however a person of skill in the art would be able to readily adapt the teachings, features and devices presented in this disclosure to other types of steering systems, such as mechanical, hydraulic and others. FIG. 2 is a perspective view of an embodiment of a non-contact angle/torque sensor, FIG. 3 is a plan view illustrating an embodiment of an upper rotor of the non-contact angle/torque sensor, FIG. 4 is an enlarged view of a portion A of FIG. 3, FIG. 5 is a view illustrating an embodiment of a lower rotor of the non-contact angle/torque sensor, FIG. 6 is an enlarged view of a portion B of FIG. 5, FIG. 7 is a view illustrating an embodiment of a flux collector, and FIG. 8 is a plan view partly illustrating a state in which an embodiment of an upper rotor and an embodiment of a lower rotor of a non-contact angle/torque sensor according are coupled with each other.

As illustrated in FIG. 2, an embodiment of a non-contact angle/torque sensor can include an upper rotor 100 and a lower rotor 200.

Upper Rotor

Figure 20:
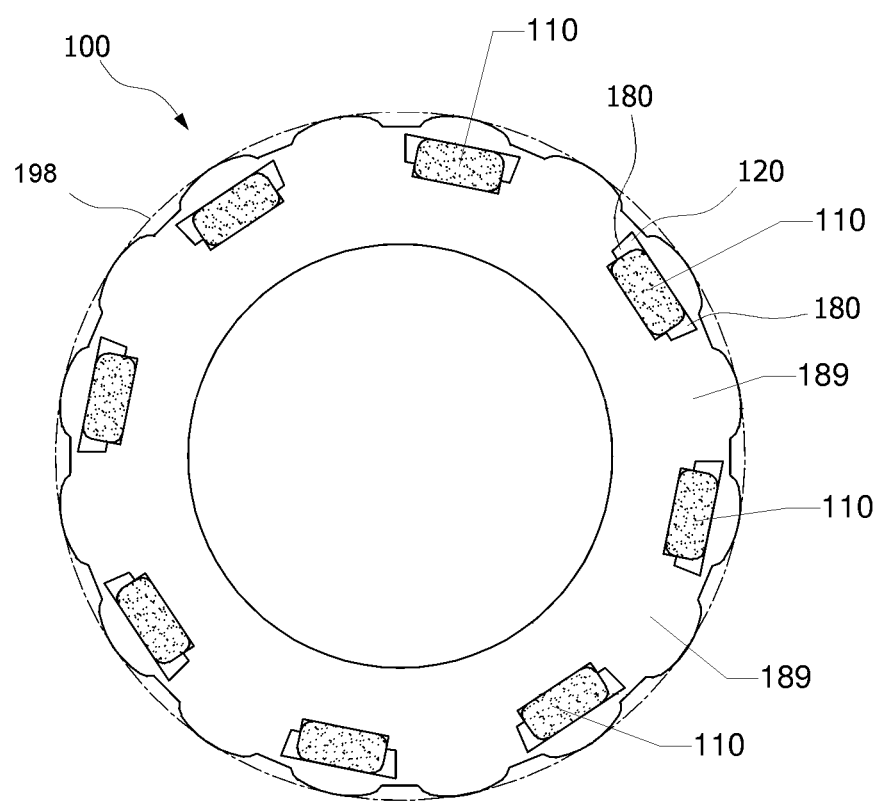
FIG. 20 shows an embodiment with upper rotor material as induced magnets.

The upper rotor 100 can be connected with the upper half 51 of the shaft, and can be formed in an annular shape. A plurality of magnets 110 can be located in the upper rotor 100. In some embodiments, the plurality of magnets can be arranged in an annular shape as shown in FIG. 3. In some embodiments, the magnets 110 can be proximate an outer circumference of the upper rotor 100 as shown in FIG. 3. In some embodiments, the magnets 110 can be equally spaced around the upper rotor 100, such as is shown in FIG. 3. In various embodiments, there can be an even number of magnets 110. In some embodiments, one or more or all of the magnets 110 can be located in magnet pockets 120, such as is shown in FIG. 3. In some embodiments, there can be 2, 4, 6, 8, 10, 12, 14, 16, 18, 20, 22, 24 or more magnets 110 and/or magnet pockets 120. In some embodiments, the number of magnets 110 and magnet pockets 120 can be the same. In some embodiments, magnets having N-pole 111 and S-pole 112 can be positioned in the upper rotor 100 or can be inserted into magnet pockets (120) with alternating pole orientation. In some embodiments, such as in FIGS. 2 and 3, the poles 111 and 112 can be oriented parallel or substantially parallel to the central axis 188. For example, as illustrated in FIGS. 2 and 3, an embodiment includes sixteen magnets 110 and sixteen magnet pockets 120 with the magnets 110 located with the direction of pole orientation reversing between successive magnets 110, with an N-pole directed in a first direction, followed by an S-pole directed in that first direction, followed by an N-pole directed in that first direction, followed by an S-pole directed in that first direction, etc. as one proceeds around the upper rotor 100. In some embodiments, magnets 110 can be oriented with N-poles and S-poles alternatingly directed radially outward and inward such that an N-pole points radially outwardly followed by an S-pole points radially outward followed by an N-pole points radially outward, etc. as one proceeds around the upper rotor 100. In some embodiments, an N-pole can be located between two S-poles and in some embodiments, an S-pole can be located between two N-poles. In some embodiments, each of the plurality of magnets 110 can be a magnetic material that is magnetized prior to being located within upper rotor 110. In some embodiments, one or more of the plurality of magnets 110 can be magnetized after it is positioned in upper rotor 100. In some embodiments, the plurality of magnets 110 can comprise permanent magnets, electromagnets or induced magnets and combinations thereof. In some embodiments, one or more of the plurality of magnets 110 can be an induced magnet 189 which displays an N-pole 111 and an S-pole induced by one or more permanent magnets or electromagnets being located nearby to the induced magnet 189. In some embodiments, an induced magnet can be an unmagnetized soft magnetic material which is inserted into the upper rotor 100 and is acted upon by nearby magnets to induce an N-pole and an S-pole in the soft magnetic material resulting in an induced magnet 189, as in FIG. 3. In some embodiments, an induced magnet 189 can be material of the upper rotor itself adjacent to one or between two other magnets 110, such as permanent magnets or electromagnets, as shown in FIG. 20. In some embodiments, there can be at least 1 induced magnet 189 located in the upper rotor 100. In some embodiments, there can be 1, 2, 3, 4, 5, 6, 7, 8, 9, 10, 11, 12 or more induced magnets in the upper rotor 100. In some embodiments one quarter or one half of the number of magnets 110 can be induced magnets 189.

Figure 18:
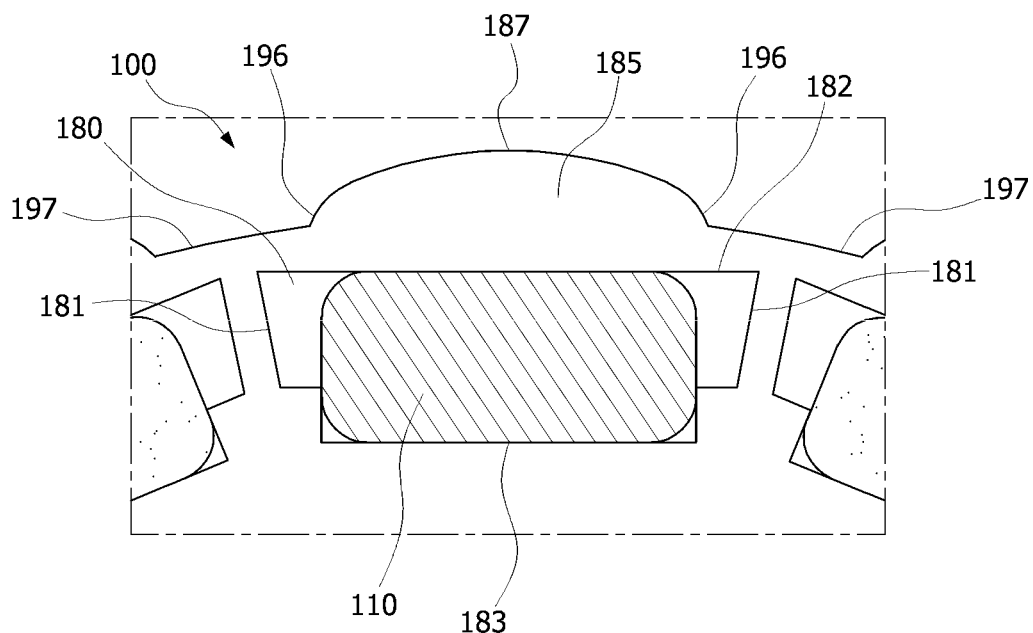
FIG. 18 shows an embodiment of a magnet inside a magnet pocket.

The magnets 110 can be formed to have a rectangular bar-shaped cross section, but in various embodiments other shapes can be used, such as cylindrical, round, curved, segmented, and the like, and in some embodiments, the magnet 110 within at a location of the upper rotor 100 or within a magnet pocket 120 can be a series of individual magnets present together at the location of the upper rotor 100 or in the magnet pocket 120. The magnet pockets 120 can be formed to correspond to the shape of the magnets 110, such as a rectangular shape to receive a rectangular magnet 110. However, in some embodiments, it can be beneficial to have a gap in the magnetic material along at least a portion of the side(s) of one or more of the magnets 110. Without wishing to be limited by theory, it is believed that such a gap in the magnetic material can result in improved sensitivity for a torque/angle sensor by reducing leakage of magnetic flux and by increasing the rate of change in the magnetic field as a function of the position around the upper rotor in the vicinity of the magnets. In some embodiments, this gap in the magnetic material can take the form of a gap 180 between the body of the upper rotor 100 and the magnet 110 positioned along a side wall 181 and adjacent to an outer wall 182 and extending toward an inner wall 183 of the magnet pocket 120. In some embodiments, such as shown in FIG. 18, the gap 180 can extend partway along the outer wall 182 between the magnet 110 and the outer wall 182. In some embodiments, the gap 180 can extend from the outer wall 182 to the inner wall 183 or it can extend half-way or at least half-way to the inner wall 183. In some embodiments, air can be present in the gap 180 and in some embodiments, a different material, such as a material different from the body of the upper rotor 100, can be present in the gap. In some embodiments the material in the gap can have a lower relative magnetic permeability than that of the body of the upper rotor 100. In some embodiments, the gap can be filled with a material, such as an adhesive or an adhesive having a lower magnetic permeability than that of the body of the upper rotor 100. In some embodiments, the gap in magnetic material can be provided by using a non-magnetic material, such as a plastic, a ceramic, a glass or a metal that has lower magnetic permeability than the portion of the upper rotor 100 between the magnet 110 and the countering portion 212 or 222 and/or the portion of the upper rotor 100 between the magnet 110 and the central axis. Accordingly, in some embodiments a simpler shape can be used for the magnets 110 and the manufacturing cost of the magnets 110 can be reduced. In addition, since the magnets 110 can be disposed within the upper rotor 100, the magnets 110 can be protected from being dislocated or damaged by an external impact.

Figure 19:
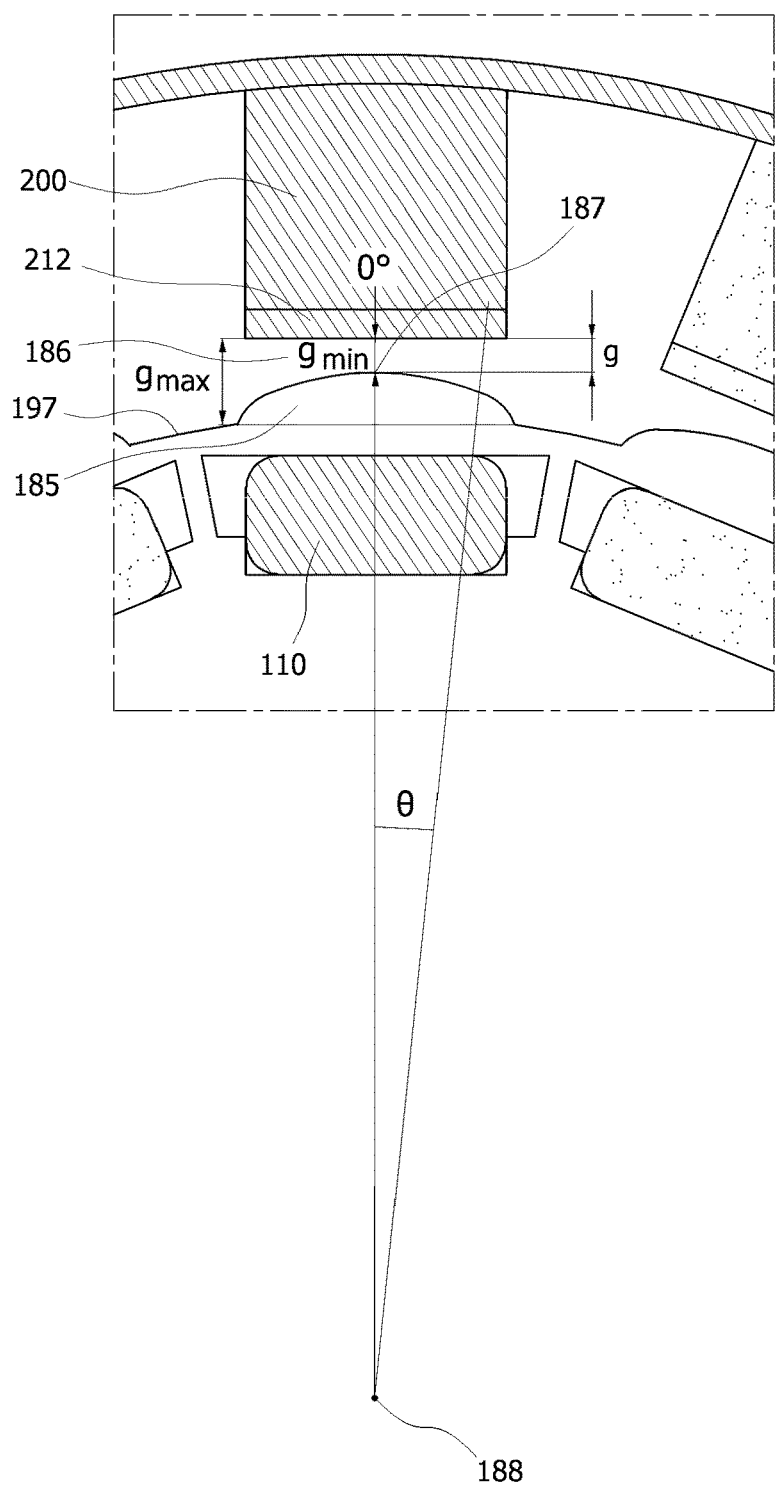
FIG. 19 shows an embodiment of an upper rotor with a curved zone and a lower rotor.

In some embodiments, the outer circumferential surface of the upper rotor 100 can be shaped with curved zones 185 where each curved zone 185 corresponds to the location of a magnet 110. The curved zones 185 can have portions with a curvature that is different from the curvature of the overall curvature circle 198 of the upper rotor 100, where the overall curvature circle 198 is a circle contacting the outermost points along the outside circumference of the upper rotor 100 corresponding to the magnet pockets 120. In some embodiments, the curved zones 185 can have a curvature that is a function of the angle, θ, which as shown in FIG. 19 can be the angle between a point of the curved zone 185, such as the midpoint or the closest approach point between the curved zone 185 and the countering portion 212 or 222, and the position on the outer surface of the curved zone 185. In some embodiments, the function can be a non-constant function. In some embodiments, the curvature can vary continuously over the curved zone 185, meaning that adjacent points have different curvatures. In some embodiments, the curved zone comprises a section where the curvature varies continuously. In some embodiments, the curved zones 185 can be semi-circles or portions of circles having a radius of curvature less than the overall curvature. In some embodiments, the curved zones 185 can form a sinusoidal curve or a portion of a sinusoidal curve, or one half of a sinusoidal curve or less than half of a sinusoidal curve. In some embodiments, the curved zones 185 can be formed to provide a gap between the curved zone 185 and the lower rotor (100) which varies in a sinusoidal fashion. In some embodiments, the curved zone can be a curve which begins and ends at bridging surfaces 197, such as are shown in FIGS. 8 and 19 where bridging surfaces 197 are located along the outer surface of the upper rotor 100 and interconnect the curved zones 185. In some embodiments, the curved zones can be a truncated curve with connecting surfaces 196 connecting the curved zones 185 to the bridging surfaces 197. In some embodiments, the connecting surfaces 196 can be straight or curved or vertical or sloped. In some embodiments, one or more or all curved zones 185 can be a compound curve comprising interconnected curves which can be connected to a bridging surface 197 and/or a connecting surface 196. In some embodiments, the ends of the curved zones 185 can correspond to the edges of the magnets 110 which are adjacent to the side walls 181 of the magnet pockets 120. In some embodiments, the ends of the curved zones can be located inboard or outboard of the edges of the magnets 110 which are adjacent to the side walls 181 of the magnet pockets 120. In some embodiments, ends of curved zones 185 can be a mixture of corresponding to, being inboard and being outboard of edges of the magnets 110 which are adjacent to the side walls 181 of the magnet pockets 120. In some embodiments, connecting surfaces 196 can correspond to a location of a magnet 110. In some embodiments, connecting surfaces 196 can correspond to the location of an induced magnet 189. In some embodiments, connecting surfaces 196 can correspond to the location of each induced magnet in upper rotor 100.

In some embodiments, curved zones 185 can have a shape to provide a rotor gap 186 between the curved zones 185 and the upper extension 211 or first countering portion 212 and the lower extension 221 or second countering portion 222 as shown in FIG. 8 appropriate rotor gap (186) g between the first and second countering portions 212 and 222 and the curved zone 185 over the range of $g_{min}$ to $g_{max}$ can be defined by the following Equation 1:

$$g(\theta) = \frac{g_{min}}{\cos\left(\frac{P}{2}\theta\right)}, \text{ for } -\frac{180°}{P} < \theta < +\frac{180°}{P} \quad \text{[Equation 1]}$$

Wherein:
g(θ) is the gap between the upper and lower rotor at angular position θ,
$g_{min}$ is the minimum magnetic gap between upper and lower rotors
P is the number of magnets, and
$g_{max}$ is the maximum gap between the upper and lower rotors located at an end of the curved zone, and
θ is the angular position around the circumference of the upper rotor 100 with 0 at the midpoint 187 of one of the curved zones and the apex being at the central axis 188 of the upper rotor 100, as shown in FIG. 19.

In various embodiments, the curved zones can concentrate the magnetic flux generated from the magnets 110 inserted into the upper rotor 100 toward the lower rotor 200.

Lower Rotor

The lower rotor 200 can be associated with or connected to the lower half 52 of the shaft which can be connected to the upper half 51 of the shaft through a torsion bar, and the lower rotor 200 can be formed in an annular shape, like the upper rotor 100. In some embodiments, the lower rotor 200 can be arranged to be spaced from the outer circumferential surface of the upper rotor 100, and can serve to change the magnetic flux by relative rotation with the upper rotor 100.

As illustrated in FIGS. 2 and 5, in some embodiments the lower rotor 200 can include an upper stator 210 and a lower stator 220. The lower stator 220 can be arranged to be spaced a predetermined distance from a lower side of the upper stator 210. In some embodiments, the lower stator 220 can be parallel to the upper stator 210. In some embodiments, the upper stator 210 and lower stator 220 can be mirror images of each other angularly offset from one another by an offset angle. In some embodiments, the offset angle can be related to the number of magnets 110 in the upper rotor 100. In some embodiments, the offset angle can be related to the number of magnets 110 by the equation: offset angle (in degrees) =360/P, where P=the number of magnets 110 in the upper rotor 100 where the number of lower or upper extensions in upper stator 210 and lower stator 220 is one half of the number of magnets. In some embodiments, the offset angle can be approximately 22.5°. In some embodiments, the offset angle for a system with 16 magnets 110 in the upper rotor 100 and 8 extensions each of the upper stator 210 and lower stator 220 can be approximately 22.5°.

Meanwhile, as illustrated in FIGS. 5 and 6, a plurality of upper extensions 211 and lower extensions 221 can protrude from the upper backplane 191 and lower backplane 192 toward the outer circumferential surface of the upper rotor 100 and can be formed on inner circumferential surfaces of the upper stator 210 and the lower stator 220. The number of upper extensions 211 and lower extensions 221 together can be equal to the number of magnets with each of the magnets 110 having a first pole orientation, as described above in the discussion of the upper rotor 100, being associated with a separate upper extension 211 and each of the magnets 110 with a different pole orientation being associated with a separate lower extension 221. In various embodiments, such as those shown in FIGS. 5, 6 and 9-17, a backplane can have a larger, smaller, similar or equivalent vertical dimension from that of the upper extensions 211 and/or lower extensions 221.

In some embodiments, the upper extensions 211 and the lower extensions 221 can comprise a first countering portion 212 and a second countering portion 221, respectively. The first countering portion 212 can be formed at an end of each upper extension 211 to face the outer circumferential surface of the upper rotor 100. The second countering portion 222 can be formed at an end of each lower extension 221 to face the outer circumferential surface of the upper rotor 100. The first countering portion 212 and the second countering portion 222 can be arranged in parallel with the outer circumferential surface of the upper rotor 100, and thus the magnetic flux of the magnet poles 110 in the upper rotor 100 may be concentrated on the lower rotor 200 side.

In addition, in some embodiments, upper extension 211 and the lower extension 221 can be configured and arranged to as to not intermesh or overlap with one another. For example, the upper extension 211 and its first countering portion 212 can be above a space between adjacent lower extensions 221 and their second countering portions 222, but not be present between the lower extensions 221 and their second countering portions 222. Also, the lower extension 221 and its second countering portion 222 can be below the space between adjacent upper extensions 211 and their first countering portions 212, but not between the upper extensions 211 and their first countering portions 212. Further, the upper extension 211 is not present directly above, in part or in whole, the lower extension 221, and the lower extension is not present directly below, in part or in whole, the upper extension 211. One embodiment demonstrating this relationship between upper extension 211 and lower extension 221 is illustrated in FIG. 5.

The upper extensions 211, the lower extensions 221, the first countering portions 212 and the second countering portions 222 can be formed in various shapes, with some embodiments further described below. In addition, the upper extensions 211, lower extensions 221, first countering portions 212 and second countering portions 222 can each include square, rectangular, triangular, cylindrical, rounded, angular and truncated portions.

Further, the upper stator 210 and the lower stator 220 may be made of any suitable material or combination of materials, such as a magnetic material or in particular embodiments a soft magnetic material including, but not limited to a soft magnetic material made by stamping, pressing, forging, lamination or by powdered metal methods. Suitable materials can include steel, iron, cobalt or nickel as well as compositions including steel, iron, cobalt or nickel and alloys of iron, cobalt or nickel.

Flux Collector

In some embodiments, for example as illustrated in FIG. 7, the non-contact angle/torque sensor can include a flux collector 300 configured and positioned spaced from the lower rotor 200. In some embodiments, the flux collector 300 can include a first flux collector 310 arranged to be spaced apart from an outer circumferential surface of the upper stator 210, and a second flux collector 320 arranged to be spaced apart from an outer circumferential surface of the lower stator 220.

In some embodiments, the upper rotor, the lower rotor 200 and flux collector 300 can be configured and/or oriented such that the flux collector 300 and the lower rotor 200 do not overlap or are intermeshed with one another at one or more of the top, a middle and a bottom of the flux collector 300 or the lower rotor 200. In some embodiments, the flux collector 300 does not extend over or under the lower rotor 200. In some embodiment, such lack of overlap and lack of intermeshing can facilitate assembly and repair of an angle/torque sensor as described herein by, for example, allowing for a flux collector 300 to be removed from association with the lower rotor 200 without removing the lower rotor 200, or allowing for a lower rotor 200 to be removed without the removal of the flux collector 300. In some embodiments, the flux collector 300 and lower rotor 200 can be configured and arranged such that there is no intermeshing or overlap in an upper portion, a middle portion and a lower portion of the flux collector 300 and the lower rotor 200.

The flux collector 300 can serve to collect the magnetic flux transmitted to the lower stator 220. The first flux collector 310 and the second flux collector 320 may be induced to have poles opposite to the poles of the upper stator 210 and the lower stator 220, respectively proximal to the first flux collector 310 and the second flux collector 320.

In some embodiments, such as are described above, the flux collector 300 can be independently separated from the upper rotor 100 and the lower rotor 200, and can be arranged on a separate printed circuit board (PCB). The printed circuit board (PCB) can be installed in the a probe housing. In some embodiments, such a construction can allow the upper rotor 100, the lower rotor 200 and the probe housing to be independently serviced, such as by allowing removal and replacement of the probe housing without removal of the upper rotor 100 or the lower rotor 200, or by allowing replacement of one or more of the upper rotor 100 and lower rotor 200 without removal of the probe housing or removal of the other of the upper rotor 100 and lower rotor 200.

In some embodiments, the flux collector 300 can be formed to be included in the upper rotor 100 or the lower rotor 200 or trapped between the upper rotor 100 and lower rotor 200. However, such arrangements can require the whole angle/torque sensor be replaced, even when only one part, such as the flux collector 300, breaks. In some embodiments, it can be advantageous for the flux collector 300 to be separately formed as described herein, providing a configuration where only the flux collector 300 can be replaced when only the flux collector 300 breaks. With such configurations, it can be possible to reduce customer support costs and to provide convenience in manufacturing the product.

In various embodiments, the flux collector 300 can have different lengths and can be present as an arc spanning different portions of a circle around central axis 188. In some embodiments, the number of degrees that the flux collector 300 can span around central axis 188 can be related to the number of magnets 110. In some embodiments, the number of degrees can span is equal to 360 divided by the number of magnets 110. In some embodiments, a collector gap 195 can be present between the flux collector 300 and the lower rotor 200, and the size of this collector gap 195 can be calculated through an analytical or finite element based calculation and optionally verified by experiment. In some embodiments, the collector gap 195 between the flux collector 300 and the lower rotor 200 can be present as a constant dimension or a substantially constant dimension running the length of the flux collector 300. In some embodiments, the size of this collector gap 195 can vary along the length of the flux collector 300, such as would result from the flux collector shape approximating a curve through a series of straight sections, or the size of the collector gap 195 can be varied by using a different shape for the corresponding surfaces of the flux collector 300 and the lower rotor 200, such as by using the same or different radius of curvature over at least a portion of the flux collector 300/lower rotor 200 or by imparting a sinusoidal shape to one or both of the flux collector 300 and lower rotor 200. In some embodiments, the gap can be formed in a sinusoidal fashion. In some embodiments, the collector gap 195 be formed in various shapes as desired and the shape can optionally be designed through the use of analytical or finite element based calculation methods. In some embodiments, air can be present in the collector gap 195 and in some embodiments, air can be present in the entire collector gap 195.

Magneto-Sensitive Element

In some embodiments, such as illustrated in FIG. 8, a magneto-sensitive element 330 such as a hall or MR sensor may be disposed between the first flux collector 310 and the second flux collector 320.

Various Designs of Lower Rotors/Stators/Extensions and Flux Collectors

In various embodiments, different shapes of the upper extensions 211, lower extensions 221, first countering portions 212 and second countering portions 222 can be used, such as are shown in FIGS. 9 to 17. FIGS. 9 to 17 are cross-sectional views taken along line C-C' of FIG. 2.

As illustrated in FIGS. 9 to 17, various embodiments described herein can include an upper rotor 100 in which the magnets 110 are inserted, an upper stator 210, a lower stator 220, a first flux collector 310, and a second flux collector 320.

One side of the upper stator 210 and one side of the lower stator 220 can be spaced apart from the upper rotor 100 wherein the magnets 110 are located. As discussed herein, in some embodiments the space between the lower stator 220 and the upper rotor 100 can vary due to the presence or absence of curved zones or can vary due to the addition of slots, grooves, and the like. Also as discussed herein, in some embodiments, a portion of the lower rotor 200, such as the backplane 191 of the upper stator and/or the backplane 192 of the lower stator can be arranged in relation to the flux collector 300 to be spaced apart from the first flux collector 310 and the second flux collector 320, respectively.

In some embodiments, the upper stator 210 and the lower stator 220 can include the upper extension 211 and the lower extension 221, respectively, which can also comprise the first countering portion 212 and the second countering portion 222. The upper extension 211, the lower extension 221, the first countering portion 212 and the second countering portion 222 can be present in various shapes as desired.

Figure 9:
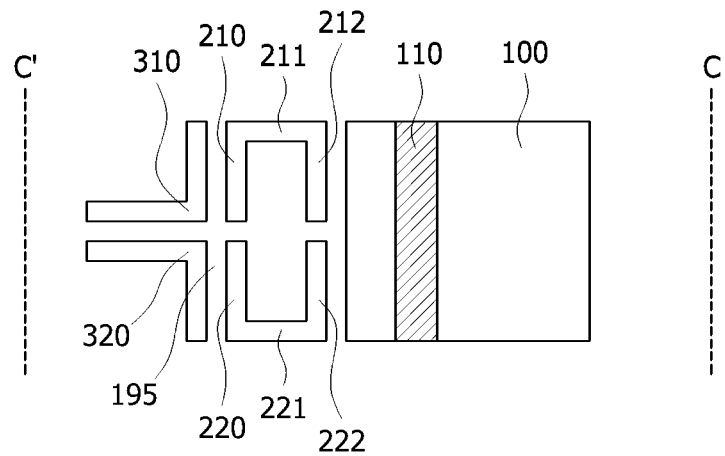
FIGS. 9 to 17 are cross-sectional views taken along line C-C' of FIG. 2 for various embodiments of the present disclosure.
Figure 10:
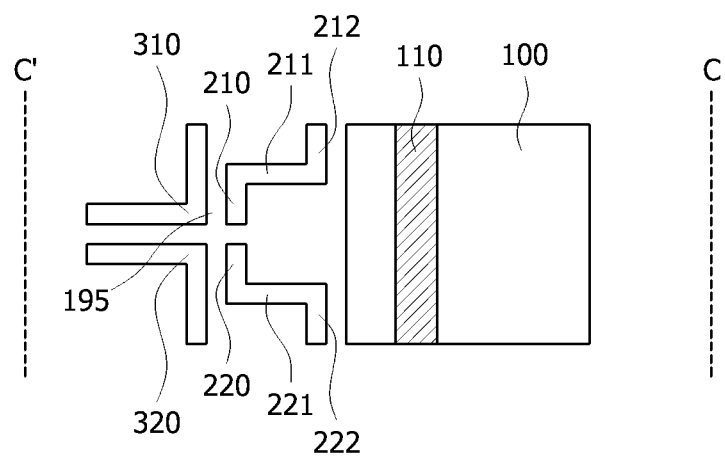

In some embodiments, such as are illustrated in FIGS. 9 and 10, the upper extension 211 can be formed to protrude from an upper portion of the inner circumferential surface of the upper stator 210 toward the outer circumferential surface of the upper rotor 100, and the lower extension 221 can be formed to protrude from a lower portion of the inner circumferential surface of the lower stator 220 toward the outer circumferential surface of the upper rotor 100. In addition, the first countering portion 212 and the second countering portion 222 can be formed to face the outer circumferential surface of the upper rotor 100 and can be formed at ends of the upper extensions 211 and the lower extensions 221, respectively. The first countering portion 212 can be formed upward, and the second countering portion 222 can be formed downward, as illustrated in FIG. 9. Alternatively, the first countering portion 212 can be formed downward, and the second countering portion 222 can be formed upward, as illustrated in FIG. 10.

Figure 11:
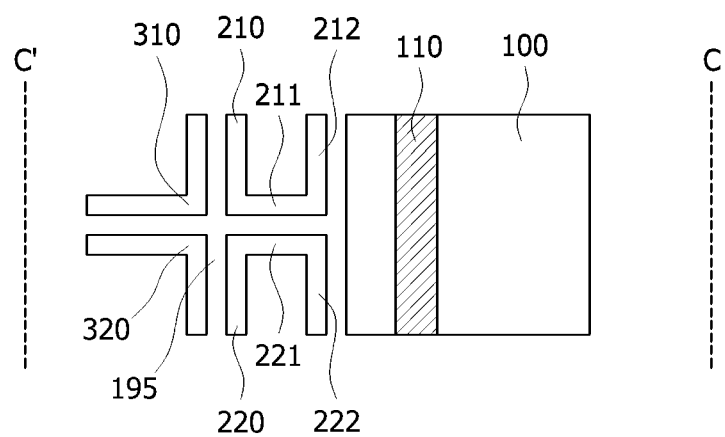
Figure 12:
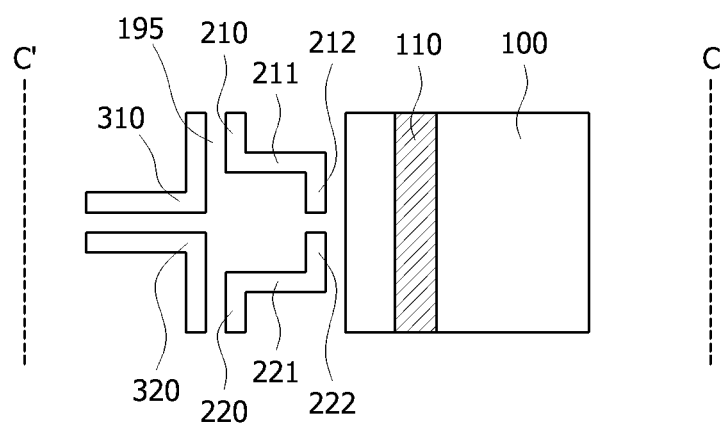

In some embodiments, such as are illustrated in FIGS. 11 and 12, the upper extension 211 can be formed to protrude from the lower portion of the inner circumferential surface of the upper stator 210 toward the outer circumferential surface of the upper rotor 100, and the lower extension 221 can be formed to protrude from the upper portion of the inner circumferential surface of the lower stator 220 toward the outer circumferential surface of the upper rotor 100. In addition, the first countering portion 212 and the second countering portion 222 which can be formed to face the outer circumferential surface of the upper rotor 100 can be formed at the ends of the upper extension 211 and the lower extension 221, respectively. The first countering portion 212 can be formed upward, and the second countering portion 222 can be formed downward, as illustrated in FIG. 11. Alternatively, the first countering portion 212 can be formed downward, and the second countering portion 222 can be formed upward, as illustrated in FIG. 12.

Figure 13:
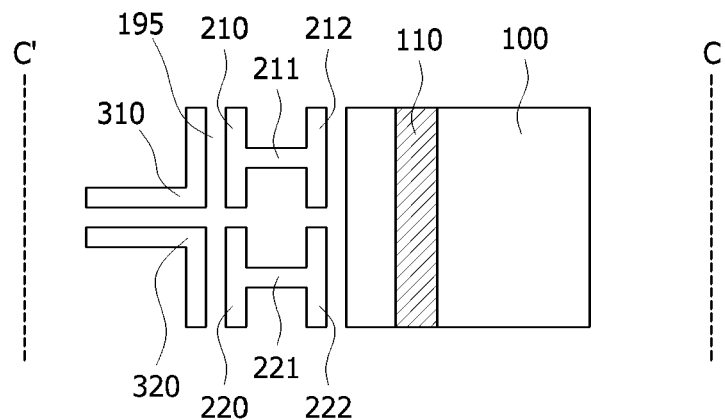

In another embodiment, such as is illustrated in FIG. 13, the upper extension 211 can be formed to protrude from a middle area of the inner circumferential surface of the upper stator 210 toward the outer circumferential surface of the upper rotor 100, and the lower extension 221 can be formed to protrude from a middle area of the inner circumferential surface of the lower stator 220 toward the outer circumferential surface of the upper rotor 100. In addition, the first countering portion 212 and the second countering portion 222 which can be formed to face the outer circumferential surface of the upper rotor 100 can be formed at the ends of the upper extension 211 and the lower extension 221, respectively. The first countering portion 212 can be formed upward and downward, and the second countering portion 222 can also be formed upward and downward, as illustrated in FIG. 13.

Figure 14:
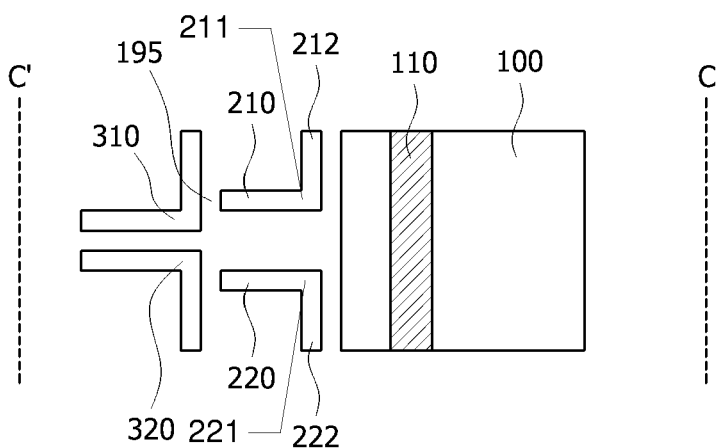
Figure 15:
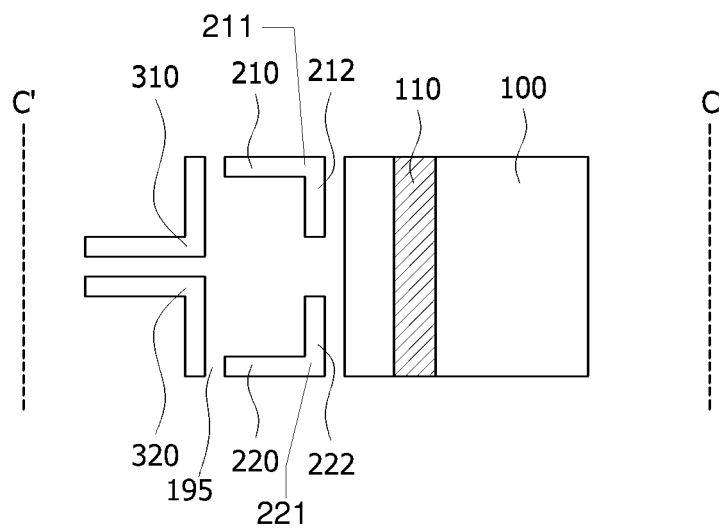
Figure 16:
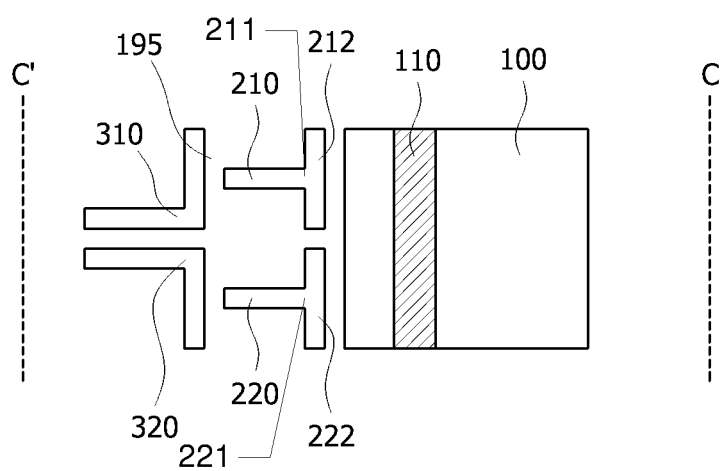

In some embodiments, such as are illustrated in FIGS. 14 and 16, the upper stator 210 and the lower stator 220 can be formed to have small thicknesses, and then the first countering portion 212 and the second countering portion 222 can be formed at the inner circumferential surfaces of the upper stator 210 and the lower stator 220, respectively. In one embodiment, as illustrated in FIG. 14, the upper extension 211 and first countering portion 212 which can be formed upward to face the outer circumferential surface of the upper rotor 100 can be formed at the inner circumferential surface of the upper stator 210, and the lower extension 221 and second countering portion 222 which can be formed downward to face the outer circumferential surface of the upper rotor 100 can be formed at the inner circumferential surface of the lower stator 220. In another embodiment, as illustrated in FIG. 15, the upper extension 211 and first countering portion 212 which can be formed downward to face the outer circumferential surface of the upper rotor 100 can be formed at the inner circumferential surface of the upper stator 210, and the lower extension 221 and second countering portion 222 which can be formed upward to face the outer circumferential surface of the upper rotor 100 may be formed at the inner circumferential surface of the lower stator 220. In another embodiment, as illustrated in FIG. 16, the upper extension 211 and first countering portion 212 which can be formed upward and downward to face the outer circumferential surface of the upper rotor 100 can be formed at the inner circumferential surface of the upper stator 210, and the lower extension 221 and second countering portion 222 which can be formed upward and downward to face the outer circumferential surface of the upper rotor 100 can be formed at the inner circumferential surface of the lower stator 220.

Figure 17:
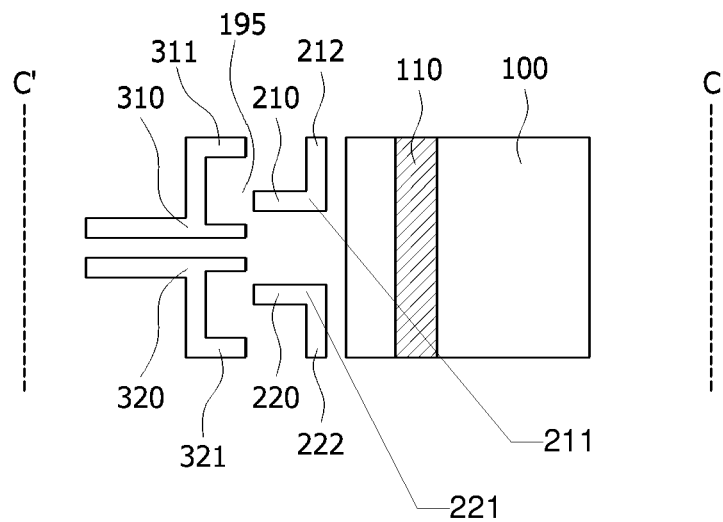

In addition, as illustrated in FIGS. 14 to 16, when the upper stator 210 and the lower stator 220 can be formed to have small thicknesses, the first flux collector 310 and the second flux collector 320 can be formed to include a protruding portion 311, such as is illustrated in FIG. 17. In some embodiments, the first flux collector 310 can include at least one protruding portion 311 which can be formed to protrude toward the outer circumferential surface of the upper stator 210, and the second flux collector 320 can include at least one protruding portion 321 which can be formed to protrude toward the outer circumferential surface of the lower stator 220. In one embodiment, as illustrated in FIG. 17, the upper stator 210 can be arranged to be spaced apart from two protruding portions 311 which can be formed at the first flux collector 310, and the lower stator 220 can be arranged to be spaced apart from two protruding portions 321 which can be formed at the second flux collector 320. In some embodiments of the device shown in FIG. 17, intermeshing or overlapping between the upper stator 210 and two protruding portions 311 or between the lower stator 220 and two protruding portions 321 can be avoided.

In some embodiments of the non-contact angle/torque sensor described herein, when a gap is present between the upper rotor 100 and the lower rotor 200, the lower rotor 200 including the two stators, the magnetic flux can be generated in a non-contact manner as described herein, and the non-contact angle/torque sensor can be easily manufactured.

In addition, in various embodiment described herein, the flux collector is separately formed from the rotor and can be present as a separate and separable piece, the flux collector, which can be part of the probe housing along with electronics, can be easily replaced separately from other components, or can be reused if other components of the sensor are damaged. Thus making the part as a serviceable component to the end users/customers.

Directional Language

In this disclosure, directional language such as "upper", "lower", "up", "down", "left", "right", "under", "over" and the like might have been used in various places in describing features presented herein. It should be understood that such directional terms, unless indicated otherwise by the context, should be viewed as a convenience in describing the relationship as arranged in the drawings or in the discussion and should not be viewed as an absolute direction such as would prevent rotating, reorientation, etc. an assembly or collection of parts.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A non-contact angle/torque sensor comprising:
 an upper rotor of the non-contact angle/torque sensor which is formed in an annular shape having a central axis, and in which magnets are located, the magnets being positioned within the annular shape around the central axis with north and south poles of adjacent magnets being oriented opposite to one another; and
 a lower rotor formed in an annular shape and sharing the central axis of the upper rotor, the lower rotor located spaced outwardly from an outer circumferential surface of the upper rotor, the lower rotor comprising:
  an upper stator; and
  a lower stator arranged in a spaced apart relationship along the central axis, the upper stator having:
   an upper backplane formed in a cylindrical shape parallel with the central axis; and
   a series of upper extensions extending from the upper backplane;
  the lower stator having:
   a lower backplane formed in a cylindrical shape parallel with the central axis; and
   a series of lower extensions extending from the lower backplane, wherein the upper extensions and the lower extensions are not intermeshed or overlapped; and
 a flux collector located spaced apart from the lower rotor and in magnetic communication with at least a portion of the magnets, and the flux collector does not extend over or under the lower rotor.

2. The angle/torque sensor of claim 1, wherein the upper rotor comprises a plurality of magnet pockets, each magnetic pocket having an outer surface, an inner surface, a first side surface and a second side surface, the inner and outer surfaces located facing one another with the outer surface being more distal to the central axis than the inner surface, the first and second side surfaces extending between the inner and outer surfaces;
 wherein each of the magnet pockets comprises one of the magnets, and for each of the magnetic pockets, the inner surface and the outer surface contact the magnet associated with the pocket while there is a first gap between at least a portion of the first side surface adjacent the outer surface and the magnet associated with the pocket, and a second gap between at least a portion of the second side surface adjacent the outer surface and the magnet associated with the pocket.

3. The angle/torque sensor of claim 2, wherein each of the first and second gaps extend only part of the way to the inner surface.

4. The angle/torque sensor of claim 2, wherein each of the first and second gaps extend at least half way to the inner surface.

5. The angle/torque sensor of claim 2, wherein each of the plurality of magnet pockets is formed in a soft magnetic material.

6. The angle/torque sensor of claim 5, wherein the soft magnetic material is powdered metal or laminated steel.

7. The angle/torque sensor of claim 2, wherein the outer circumferential surface of the upper rotor comprises a series of curved zones curving outward from the central axis and where each of the curved zones corresponds to one of the magnet pockets, wherein at least a portion of each of the curved zones has a section having a curvature that varies continuously over the section.

8. The angle/torque sensor of claim 7, wherein a gap is present between the upper and lower extensions and the curved zones, wherein the gap at any point along the curved zone is described by the equation:

$$g(\theta) = \frac{g_{min}}{\cos\left(\frac{P}{2}\theta\right)}, \text{ for } -\frac{180°}{P} < \theta < +\frac{180°}{P} \qquad [\text{Equation 1}]$$

wherein:
 $g(\theta)$ is the gap between the upper and lower rotor at angular position $\theta$,
 $g_{min}$ is the minimum magnetic gap between upper and lower rotors,
 $g_{max}$ is the maximum gap between the upper and lower rotors located at an end of the curved zone,
 P is the number of magnets, and
 $\theta$ is the angular position around the circumference of the upper rotor with 0 at the midpoint of one of the curved zones and the apex being at the central axis of the upper rotor.

9. The angle/torque sensor of claim 1, wherein the upper and lower extensions protrude toward the outer circumferential surface of the upper rotor and the upper and lower extensions extend from inner circumferential surfaces of the upper stator and the lower stator, respectively.

10. The angle/torque sensor of claim 9, wherein the upper extensions protrude from an upper portion of the inner circumferential surface of the upper stator toward the outer circumferential surface of the upper rotor, and
the lower extensions protrude from a lower portion of the inner circumferential surface of the lower stator toward the outer circumferential surface of the upper rotor.

11. The angle/torque sensor of claim 10, wherein each of the upper extensions comprises a first countering portion, and the first countering portion is formed upward or downward at an end of each of the upper extensions to face the outer circumferential surface of the upper rotor, and
each of the lower extensions comprises a second countering portion, and the second countering portion is formed upward or downward at an end of each of the lower extensions to face the outer circumferential surface of the upper rotor.

12. The angle/torque sensor of claim 9, wherein the upper extensions protrude from a middle area of the inner circumferential surface of the upper stator toward the outer circumferential surface of the upper rotor, and
the lower extensions protrude from a middle area of the inner circumferential surface of the lower stator toward the outer circumferential surface of the upper rotor.

13. The angle/torque sensor of claim 1, wherein the upper extensions protrude from a lower portion of an inner circumferential surface of the upper stator toward the outer circumferential surface of the upper rotor, and
the lower extensions protrude from an upper portion of the inner circumferential surface of the lower stator toward the outer circumferential surface of the upper rotor.

14. The angle/torque sensor of claim 13, wherein each of the upper extensions comprises a first countering portion formed upward or downward at an end of each of the upper extensions to face the outer circumferential surface of the upper rotor, and
each of the lower extensions comprises a second countering portion formed upward or downward at an end of each of the lower extensions to face the outer circumferential surface of the upper rotor.

15. The angle/torque sensor of claim 1, wherein each of the upper extensions comprises a first countering portion formed upward and downward at an end of each upper extension to face the outer circumferential surface of the upper rotor, and
each of the lower extensions comprises a second countering portion formed upward and downward at an end of each of the lower extensions to face the outer circumferential surface of the upper rotor.

16. The angle/torque sensor of claim 1, wherein each of the upper extensions faces the outer circumferential surface of the upper rotor and is formed upward at an inner circumferential surface of the upper stator, and
each of the lower extensions faces the outer circumferential surface of the upper rotor and is formed downward at an inner circumferential surface of the lower stator.

17. The angle/torque sensor of claim 1, wherein each of the upper extensions faces the outer circumferential surface of the upper rotor and is formed downward at an inner circumferential surface of the upper stator, and
each of the lower extensions faces the outer circumferential surface of the upper rotor and is formed upward at an inner circumferential surface of the lower stator.

18. The angle/torque sensor of claim 1, wherein each of the upper extensions faces the outer circumferential surface of the upper rotor and is formed upward and downward at an inner circumferential surface of the upper stator, and
each of the lower extensions faces the outer circumferential surface of the upper rotor and is formed upward and downward at an inner circumferential surface of the lower stator.

19. The angle/torque sensor of claim 1, wherein a collector gap is present between the flux collector and an outer circumferential surface of the lower rotor in a radial direction.

20. The angle/torque sensor of claim 1, wherein the flux collector comprises a first flux collector located spaced apart from an outer circumferential surface of the upper stator and in magnetic communication with one or more of the magnets, and a second flux collector located spaced apart from an outer circumferential surface of the lower stator and in magnetic communication with at least one of the magnets.

21. The angle/torque sensor of claim 20, wherein the second flux collector is disposed at a position corresponding to the first flux collector.

22. The angle/torque sensor of claim 21, wherein the upper rotor and the lower rotor are configured to be installable and removable independently of one another.

23. The angle/torque sensor of claim 20, wherein a magneto-sensitive element is disposed between the first flux collector and the second flux collector.

24. The angle/torque sensor of claim 20, wherein the first flux collector comprises at least one collector extension which is formed to protrude toward the outer circumferential surface of the upper stator, and
the second flux collector comprises at least one collector extension which is formed to protrude toward the outer circumferential surface of the lower stator.

25. The angle/torque sensor of claim 1, wherein the upper stator is configured such that there is no protrusion from the backplane extending toward or away from the central axis other than the upper extensions.

26. The angle/torque sensor of claim 1, wherein the lower stator is configured such that there is no protrusion from the backplane extending toward or away from the central axis other than the lower extensions.

27. The angle/torque sensor of claim 1, wherein at least one of the magnets is an induced magnet.

\* \* \* \* \*